United States Patent [19]
Wirch

[11] 3,744,540
[45] July 10, 1973

[54] MULTI-MORTISING MACHINE

[76] Inventor: Charles E. Wirch, 1366 E. Palm, Altadena, Calif. 91001

[22] Filed: Nov. 18, 1971

[21] Appl. No.: 199,959

[52] U.S. Cl........... 144/309 L, 214/8.5 A, 214/6 H, 144/133 R, 144/136 R, 83/86, 83/91
[51] Int. Cl. ..................................................... B27
[58] Field of Search.......................... 214/6, 6 H, 8.5, 214/8.5 A; 83/86, 90, 91, 92; 144/136, 137, 133 R, 309 R, 309 L

[56] References Cited
UNITED STATES PATENTS

| | | | |
|---|---|---|---|
| 3,371,803 | 3/1968 | Hosch et al. | 214/8.5 A |
| 1,823,200 | 9/1931 | Johnson | 133/133 R |

Primary Examiner—Andrew R. Juhasz
Assistant Examiner—W. D. Bray
Attorney—Walter G. Maxwell

[57] ABSTRACT

A multi-mortising machine cuts longitudinally spaced apart notches across the width of a plurality of elongated beams in preparation for their use as plate material in the construction of building wall frames. The machine includes a series of spaced rotary mortising blades having working edges spaced above a stationary work support bed. A stack of side-by-side uncut beams is mounted on an elevator bed which progressively raises each row of beams in the stack above the plane of the work support bed. The beams are fed across the bed into contact with the mortising blades to notch the beams. Thereafter, the notched beams are fed to a movable accumulator bed, while a new row of beams is raised above the plane of the work support bed in preparation for the next mortising cycle. The machine continues to automatically feed uncut beams to the work support bed, mortise them, and collect the mortised beams until all the beams in the stack are mortised.

15 Claims, 8 Drawing Figures

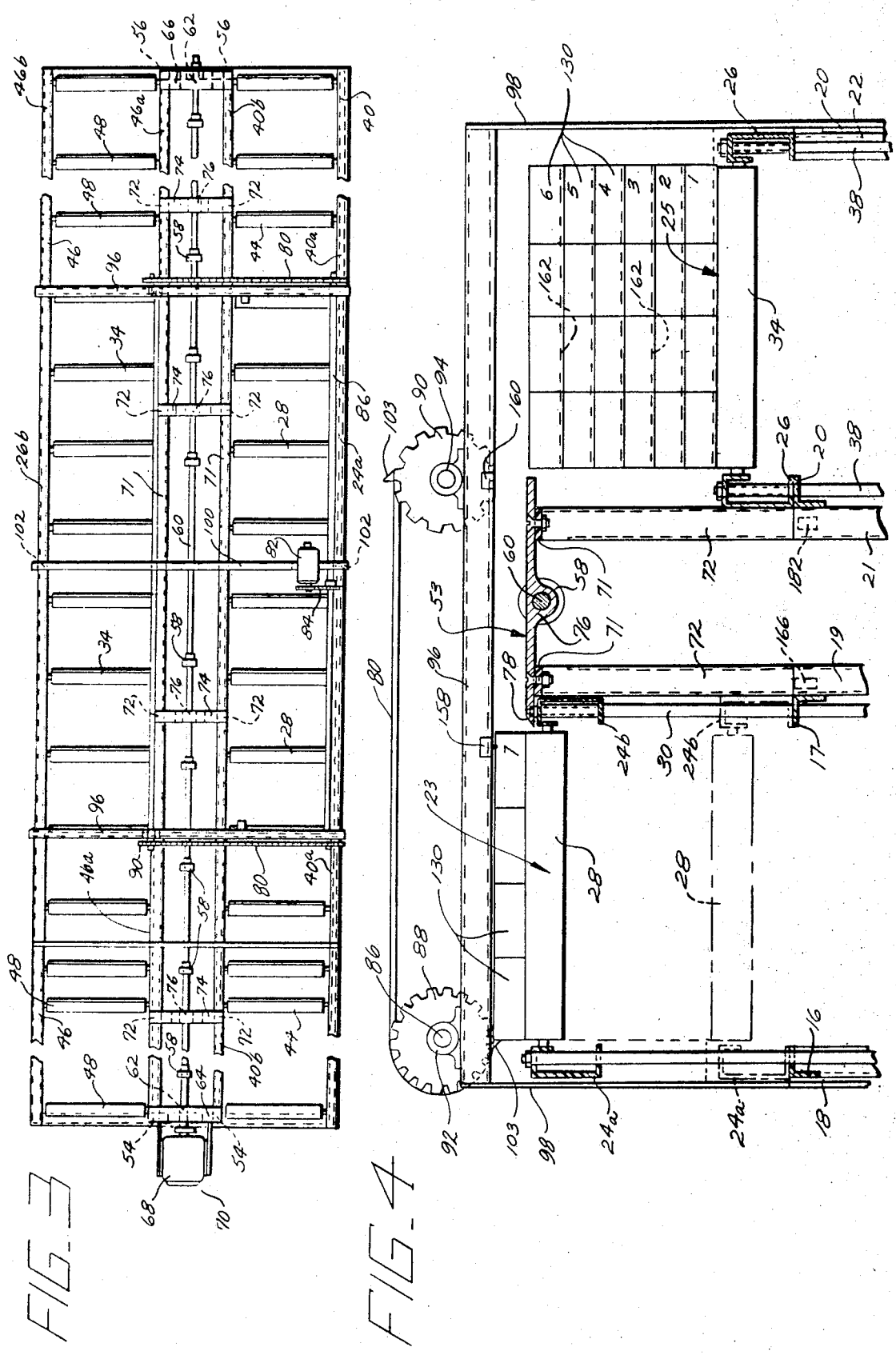

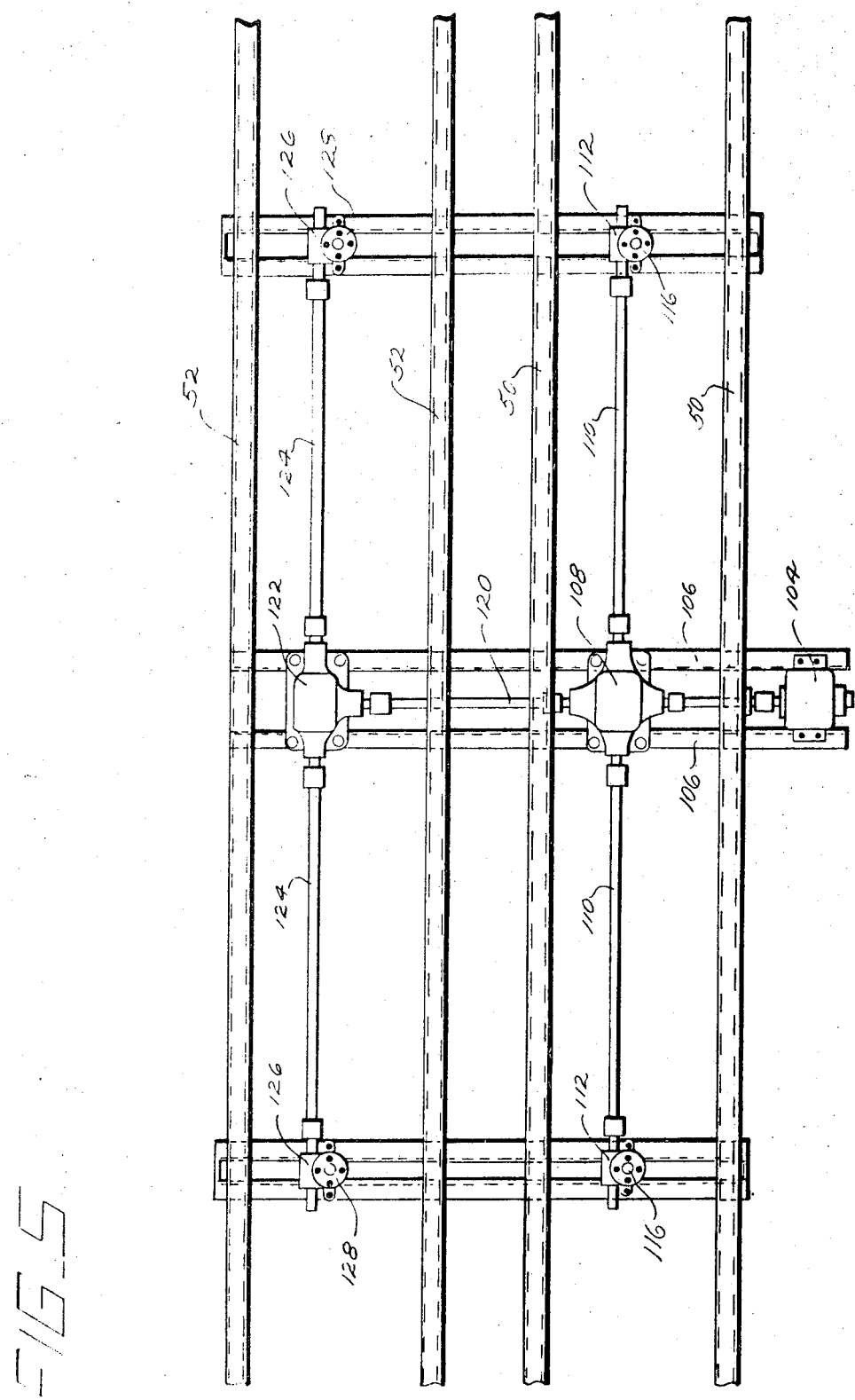

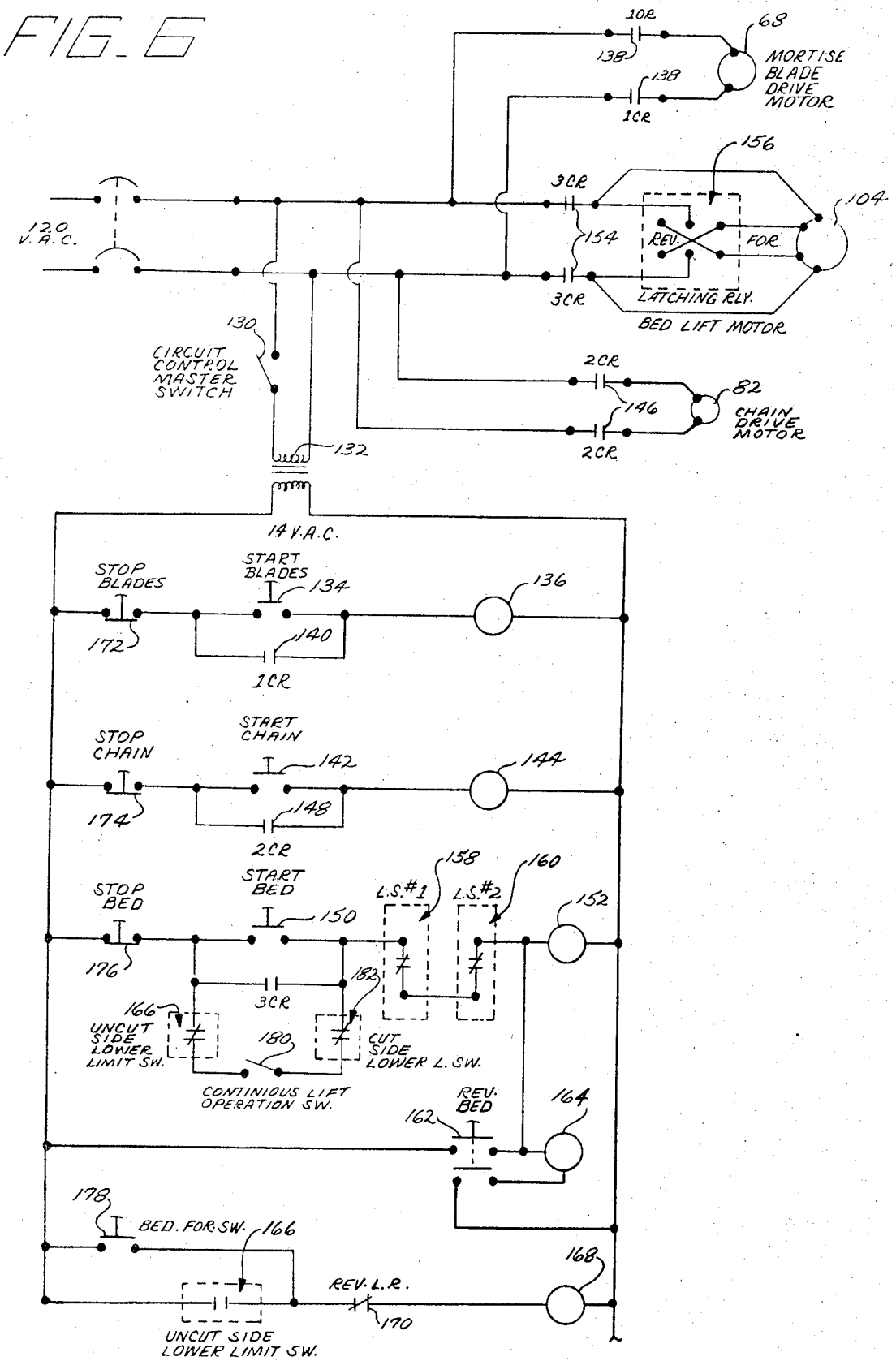

FIG_7
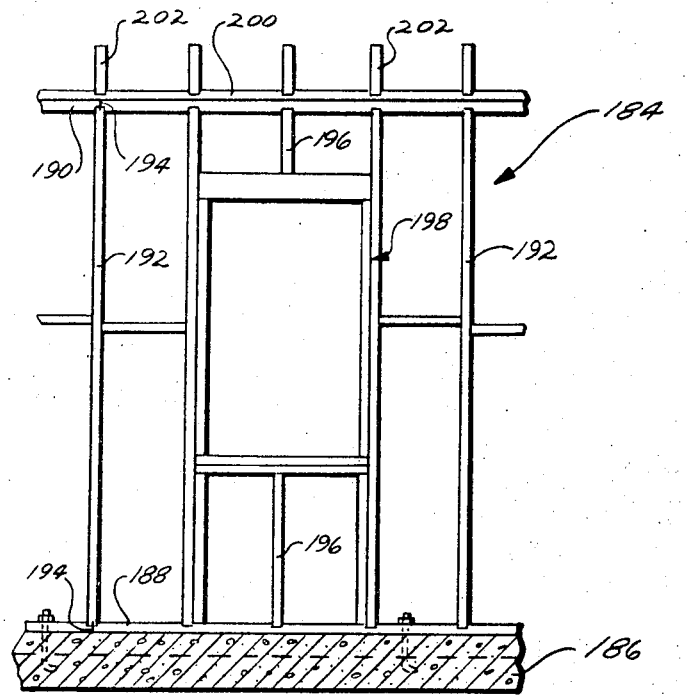
FIG_8
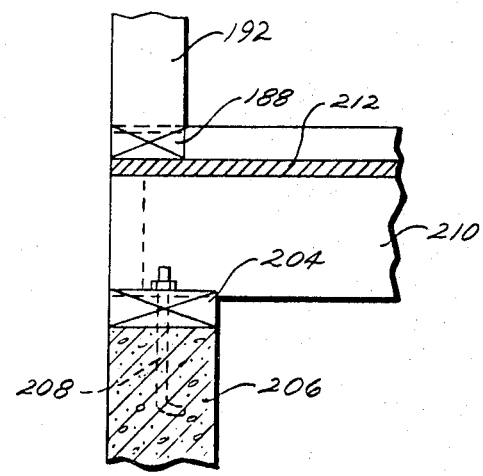

MULTI-MORTISING MACHINE

BACKGROUND OF THE INVENTION

This invention relates to wood working machines for reducing the cost and time required to construct building wall frames, and more particularly to the manufacture of prefabricated plate material for use in constructing building wall frames.

Framed wall structures for buildings and the like are commonly constructed from spaced vertically extending studs disposed between a lower plate and an upper plate. In the prior art method of wall frame construction, a workman positions the studs by accurately measuring to insure that each stud is fixed in a substantially vertical plane when the wall frame is positioned in its upright position. The upper end of each stud is nailed through the upper plate with two nails, and the lower end of each stud is nailed through the lower plate in the same manner, prior to raising the wall section into place. In those instances where the lower plate, or a mud-sill, is already secured to a concrete slab or foundation, the wall section is raised prior to nailing through the lower plate or mud-sill. Each stud is then toe-nailed with four nails to the already-secured lower plate or mud-sill.

As is well known in the art, toe-nailing involves the use of at least two nails diagonally driven into each side of the stud and into the adjacent plate to prevent the stud from twisting on its axis. The toe-nailing step, however, often causes the stud to move slightly from its desired position determined during the measuring step.

The prior art method of building construction also commonly uses a top plate above the upper plate in framed wall structures, the top plate holding spaced apart, horizontally extending ceiling joists which extend between opposing wall frames in the building under construction. The position of each ceiling joist is determined by accurately measuring to insure that the joists are parallel and square with the wall frames holding them. The ceiling joists are then toe-nailed to their corresponding top plates.

The floor joists of conventional sub-floor construction also are positioned by accurately measuring to insure that the floor joists are parallel and square with the mud-sills on which they rest.

SUMMARY OF THE INVENTION

This invention is based on the recognition that a substantial waste of time and money is caused by the prior art method of individually measuring to position each stud, ceiling joist, and floor joist in the framing of a building. The toe-nailing procedure used in the prior art also is time consuming and costly, particularly when one considers the large number of studs and joists required to construct the framing for a typical building.

Briefly, this invention contemplates constructing the framing of a building by forming longitudinally spaced apart notches across the width of a large number of beams to be used subsequently as plate material, or mud-sills in the framing. A wall frame is then constructed by placing the ends of a series of studs in the notches previously formed in a pair of beams positioned to serve as lower and upper plates of the wall frame. The studs are automatically aligned in a vertical plane because the notches in each beam are uniformly positioned with respect to the notches in all other beams. Thereafter, the studs are secured to the plates to form a rigid wall frame.

Ceiling joists also are fitted into notches previously formed in a pair of beams positioned to serve as top plates in opposing wall frames. Floor joists are fitted into notches cut in a pair of beams mounted to serve as mud-sills in the sub-floor construction.

Thus, the pre-notched beams eliminate the time consuming procedure of measuring to ascertain the exact position for each stud and joist. The pre-formed notches prevent studs and joists from twisting on their axes, and they eliminate the time consuming and costly step of toe-nailing the end of each stud and joist to their corresponding plates, or mud-sills.

In a preferred form of the invention, the beams are pre-notched by positioning a series of side-by-side elongated beams adjacent to a series of longitudinally spaced apart mortising blades, such that the length of the beams extends substantially parallel to the axes of rotation of the mortising blades. The beams are continuously moved into contact with the mortising blades to form longitudinally spaced apart notches extending across the width of each beam.

Preferably, the beams are moved across a stationary work support bed and into contact with the mortising blades, the working edges of the blades being spaced a fixed distance above the surface of the bed. Groups of side-by-side uncut beams are progressively moved to a fixed position in the plane of the work support bed, moved into contact with the mortising blades for notching, and thereafter automatically accumulated and baled for delivery to the construction site.

BRIEF DESCRIPTION OF THE DRAWINGS

These and other aspects of the invention will be more fully understood by referring to the following detailed description and the accompanying drawings in which:

FIG. 3 is a fragmentary plan elevation view taken on line 3—3 of FIG. 1;

FIG. 4 is a fragmentary elevation view taken on line 4—4 of FIG. 2 showing the elevator bed on one side of the machine and an accumulator bed on the other side of the machine;

FIG. 5 is a plan elevation view taken on line 5–5 of FIG. 2 showing the drive mechanism for lifting an lowering the elevator and accumulator beds;

FIG. 6 is a schematic electrical diagram showing the preferred electrical system for controlling the operation of the mortising machine;

FIG. 7 is a framentary elevation view showing the use of the pre-mortised beams as plate material in a typical wall frame; and FIG. 8 is a fragmentary elevation view showing the use of the pre-mortised beams as mud-sills in a typical sub-floor construction.

DETAILED DESCRIPTION OF THE PREFERRED EMBODIMENTS

Figure 1:
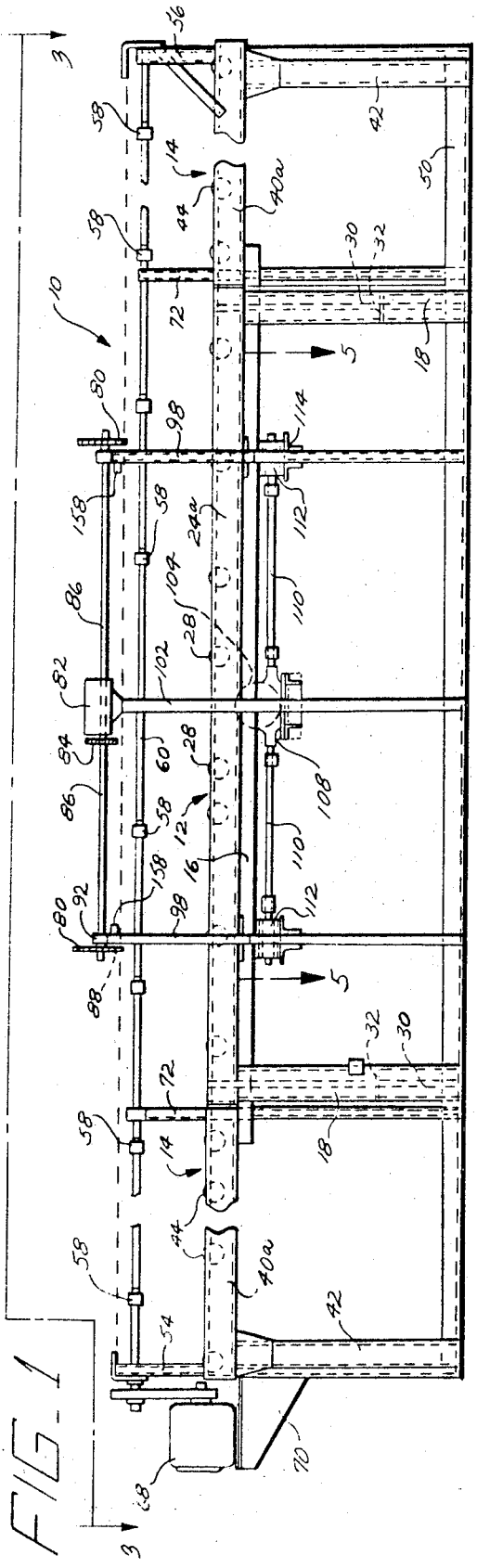
FIG. 1 is a fragmentary elevation view of a multi-mortising machine having a stack of uncut beams on an elevator bed shown in its lowered position.

Referring to FIGS. 1 through 4, a multi-mortising machine 10 includes a horizontal roller support having a central portion 12 which is movable up and down stepwise relative to a pair of opposed stationary outer portions 14.

Central portion 12 of the roller support includes a front rigid skeleton framework having a pair of laterally spaced apart and parallel, horizontal extending front and rear angle bars 16 and 17, respectively. Angle bars 16 and 17 are rigidly secured to longitudinally spaced apart front and rear posts 18 and 19, respectively.

The rigid portion of the central roller support also includes a rear rigid skeleton framework having a pair of laterally spaced apart and parallel, horizontally extending front and rear angle bars 19 and 20, respectively. Angle bars 19 and 20 are parallel to front angle bars 16, and are rigidly secured to longitudinally spaced apart front and rear posts 21 and 22 which position angle bars 19 and 20 at the same elevation as angle bars 16 and 17.

Central portion 12 of the roller support also includes a vertically movable elevator bed 23 having a pair of laterally spaced apart, horizontally extending and parallel, elongated front and rear roller support members 24a and 24b which are U-shaped in transverse cross-section. Front and rear roller support members 24a and 24b are positioned above the front and rear angle bars 16 and 17, respectively. The movable portion of the central roller support also includes a vertically movable accumulator bed 25 having a pair of laterally spaced apart, horizontally extending and parallel, elongated front and rear roller support members 26a and 26b which are U-shaped in cross-section. Front and rear roller support members 26a and 26b are positioned above front and rear angle bars 21 and 22, respectively.

Elevator bed 23 also includes a series of longitudinally spaced apart rollers 28 carried by the front and rear roller support members 24a and 24b to provide means for raising and lowering work disposed on the horizontal support surface provided by the rollers. Guided upward and downward movement of the elevator bed is provided by a pair of vertically extending, cylindrical front and rear guide bars 30 rigidly secured to opposite ends of each front and rear roller support member 24a and 24b. Guide bars 30 are slidable in vertically aligned openings extending through front and rear angle bars 16 and 17 and through a pair of angle plates 32 rigidly secured to the lower portion of posts 18 and 19.

Accumulator bed 25 also includes a series of longitudinally spaced apart rear rollers 34 carried by front and rear roller support members 26a and 26b to form a vertically movable and horizontally extending rear work support surface. Guided movement of the accumulator bed is provided by a pair of elongated vertically extending cylindrical bars 38 rigidly secured to opposite ends of each front and rear roller support member 26a, 26b. Guide bars 38 make a sliding fit in vertically aligned holes extending through front and rear channel bars 19 and 20 and through a pair of angle plates (not shown) secured to rear posts 21 and 22.

Each rigid end portion 14 of the machine adjacent opposite ends of elevator bed 23 includes a pair of laterally spaced apart and parallel, horizontally extending front and rear roller support members 40a and 40b, respectively. Front and rear roller support members 40a and 40b are U-shaped in cross-section and aligned longitudinally with roller support members 24a and 24b, respectively. The outer ends of roller support members 40a, 40b are rigidly secured to respective posts 42. The inner ends of front and rear roller support members 40a, 40b are rigidly secured to the ends of stationary angle bars 16 and 17, respectively. A series of longitudinally spaced apart rollers 44 are carried by each cooperating pair of roller supports 40a, 40b to form a separate stationary and horizontal work support bed at each end of elevator bed 23.

Each rigid end portion 14 of the machine adjacent opposite ends of accumulator bed 25 includes a pair of laterally spaced apart, horizontally extending and parallel, elongated front and rear roller support members 46a and 46b, respectively. Front and rear roller support members 46a and 46b are U-shaped in cross-section and aligned longitudinally with front and rear roller support members 26a and 26b, respectively. A series of longitudinally spaced apart rollers 48 are carried by each pair of roller support members 46a, 46b to form a stationary and horizontal rear work support bed at each end of accumulator bed 25. The outer ends of roller support members 46a, 46b are rigidly secured to respective posts (not shown) aligned laterally with posts 42. The inner ends of roller support members 46a, 46b are rigidly secured to the ends of angle bars 19 and 20, respectively.

The entire front rigid portion of the machine framework is braced at the bottom by separate longitudinally extending angle bars 50 resting on the floor and secured to the bottoms of posts 18 and 19. A similar pair of longitudinally extending bottom angle bars 52 (see FIG. 5) rest on the floor and are secured to the bottoms of posts 21 and 22.

Figure 2:
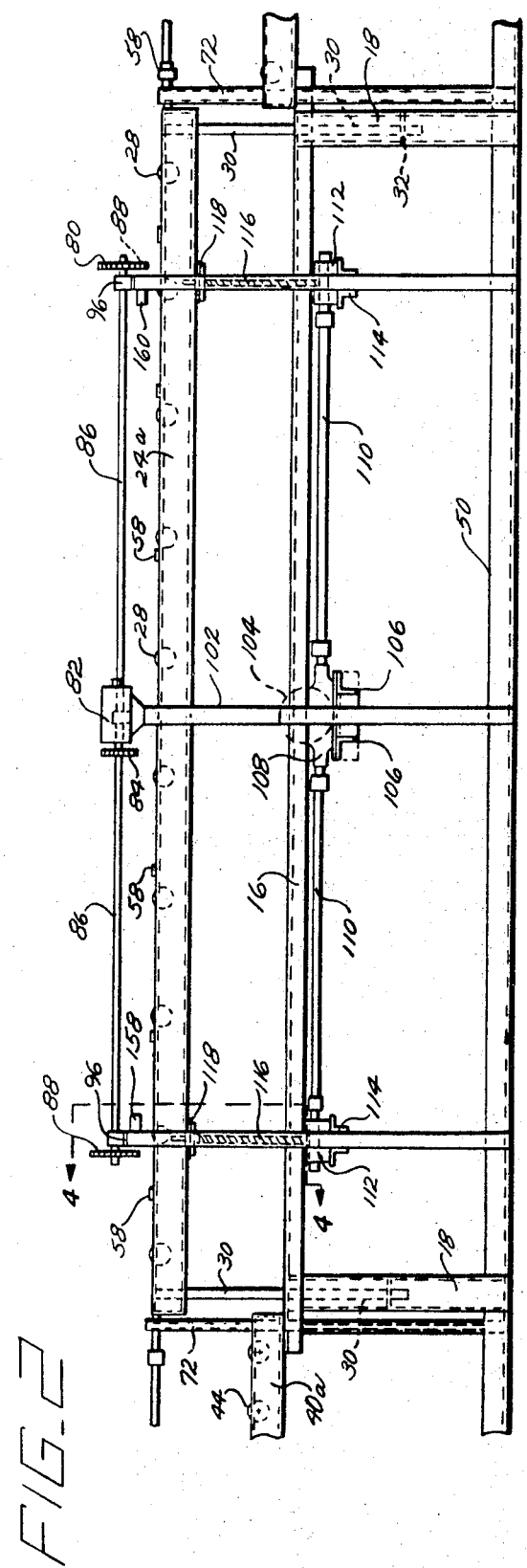
FIG. 2 is a fragmentary elevation view of the machine shown in FIG. 1 in which the elevator bed is in its uppermost position.

FIG. 1 shows the elevator bed in its initial low position in which rollers 28 and 44 form a continuous horizontal work support bed. FIG. 2 shows the elevator bed raised to its uppermost position. Preferably, the elevator bed is movable stepwise between the low position shown in FIG. 1 and the raised position shown in FIG. 2. Accumulator bed 25 moves down and up stepwise with the upward and downward movement, respectively, of the elevator bed. The accumulator bed is not shown in FIGS. 1 or 2 for clarity. The movement of the elevator bed and accumulator bed will be described in greater detail below.

The central portion of the multi-mortising machine includes an elevated horizontal mortising bed 53 (see FIG. 4) comprising a rigid framework formed from a pair of laterally spaced apart end posts 54 at one end of rigid end portion 14, and a second pair of laterally spaced apart end posts 56 at the other end of the other rigid end portion of the machine. A series of longitudinally spaced apart rotary mortising blades 58 are carried on 16-inch centers on a longitudinally extending, horizontal rotary shaft 60 supported in bearings 62 mounted on horizontal support plates 64 and 66 secured to the tops of posts 54 and 56, respectively. Shaft 60 is turned by a motor 68 mounted on a support 70 at the end of the machine.

Mortising bed 53 also includes a pair of longitudinally extending and parallel horizontal support bars 71 running the length of the machine and secured to the tops of posts 54 and 56 at their ends. Intermediate portions of support bars 71 are secured to the tops of several cooperating pairs of posts 72 located at suitably spaced points along the center of the machine. Several longitudinally spaced apart, horizontal cross-pieces 74 are secured to the tops of the longitudinal support bars 71, each cross-piece carrying a respective bearing 76 for supporting rotary shaft 60. Plates 64 and 66 and cross-pieces 74 form a laterally extending horizontal support surface for work mortised by the mortising blades. The front end portions of plates 64, 66, and cross-pieces 74 adjacent elevator bed 23 are beveled at 78 (see FIG. 4) to provide a smooth transfer of work from support rollers 28 to mortising bed 53.

A pair of longitudinally spaced apart laterally extending transfer chains 80 are mounted above elevator bed 23 and mortising bed 53. The transfer chains are driven by a motor 82 and gear drive 84 which drives a pair of longitudinally extending linkages 86 coupled to respective front drive sprockets 88 which in turn cooperate with respective rear drive sprockets 90 to which the respective drive chain are coupled. Rear drive sprockets are coupled to a longitudinally extending linkage 91. Sprockets 88 and 90 are rotatably mounted in bearings on respective brackets 92 and 94. Each pair of brackets is supported by a respective laterally extending horizontal support bar 96 secured to the tops of a respective pair of front and rear posts 98 adjacent to each end of movable central portion 12 of the machine. Drive motor 82 is supported on a laterally extending horizontal support bar 100 positioned substantially centrally between support bars 96. A pair of front and rear posts 102 support the front and rear portions of support bar 100. Each transfer chain carries a pair of opposing drag tabs 103 for moving work from the elevator bed onto the mortising bed in a manner described in detail below.

The drive mechanism for raising and lowering the elevator and accumulator platforms is shown best in FIGS. 1, 2, and 5. An elevator drive motor 104 is mounted on a pair of laterally extending angle bars 106 secured to opposite sides of posts 102. Drive motor 104 is coupled to a four-way gear box 108 which drives a pair of opposed longitudinally extending linkages 110 coupled to a pair of machine screw jactuator units 112, each of which is mounted on a respective pair of laterally extending angle bars 114 extending between front and rear posts 98. Each jactuator houses a rotatable element (not shown) which drives a respective vertically movable elevator lifting arm 116 (see FIG. 2) in response to rotation of drive motor 104. The top of each elevator lifting arm 116 is secured to a respective longitudinally extending horizontal push bar 118 (see FIG. 2) secured to the underside of the front and rear roller support bars 24a and 24b so as to raise and lower elevator bed 23 in response to rotation of drive motor 104.

Four-way gear box 108 also drives a rearwardly extending linkage 120 coupled to a three-way gear box 122, which in turn drives a pair of opposed longitudinally extending linkages 124 coupled to respective machine screw jactuator units 126 mounted to the rear of jactuators 112. Each jactuator 126 is coupled to front and rear roller support bars 26a and 26b the same way jactuators 112 are coupled to front and rear roller support bars 24a and 24b. Gear box 122 is adapted to drive the lifting arms of rear jactuators 126 in a direction opposite to that in which lifting arms 116 of the front jactuators are driven. Thus, when elevator bed 23 is lifted, accumulator bed 25 is lowered, and vice versa.

The operation of the multi-mortising machine is best understood by referring to FIGS. 4 and 6. The preferred use of the machine is for making multiple cuts or notches through beams, preferably 2 X 4 inch beams used as plates, joists, and mud-sills in conventional housing construction. Several laterally spaced apart stacks of beams 130 are initially loaded onto the elevator bed 23 and the outer fixed roller supports 14. The operator then closes a normally open circuit control master switch 131 to supply power from a 120 volt A.C. source to a transformer 132 for converting the voltage to 14 volts A.C. Switch 131 is located on a central control panel (not shown). The operator then pushes a normally open switch 134 which energizes a coil 136 of a control relay 1CR to close a pair of normally open contacts 138 to apply power to mortise blade drive motor 68. The energized relay coil 136 also closes a normally open contact 140 which continues to supply voltage to relay 1CR even after switch 134 returns to its initial open position shown in FIG. 6.

After the mortising blades are running, the machine is ready to mortise a first row of the beams stacked on elevator bed 23. The rows of beams are numbered 1 through 7 in FIG. 4, and the machine is shown sized to hold four side-by-side stacks of 2 X 4 inch beams. However, the width of the elevator and accumulator beds is not critical, and can be altered to hold fewer or more rows or stacks of beams without departing from the scope of the invention. To mortise the first row of beams, the operator pushes a normally open switch 142 located on the main control panel to energize a coil 144 to a control relay 2CR which in turn closes a pair of normally open contacts 146 to supply power to chain drive motor 82. The energized relay 2CR also closes a normally open contact 148 which continues to supply power to the chain drive motor even after switch 142 returns to its initial open position shown in FIG. 6.

A normally open switch 150 located on the main control panel is closed to supply voltage to a coil 152 of a control relay 3CR to close a pair of normally open contacts 154 and supply power to bed lift motor 104. The rotational direction of motor 104 is controlled by a latching relay 156 which is initially latched in a forward direction so that rotation of motor 104 drives the elevator bed upward and the accumulator bed downward through the previously described elevator power transmission linkage shown in FIG. 5. The elevator bed lifts the stack of beams until the upper end portions of the upper row of beams contact a pair of longitudinally spaced apart normally closed micro-switches 158 and 160 secured to each cross-piece 96. When both of switches 158 and 160 are contacted, power to relay 3CR is cut off to stop bed lift motor 104, which in turn automatically stops the elevator bed in a first beam transfer position. When the beams are in this position, drag tabs 103 of the transfer chains are able to force a first layer of beams over the mortising blades to form laterally extending, longitudinally spaced apart and parallel notches 162 in each beam. The drag tab continues to push the mortised beams past the rear end of mortising bed 53 and onto the horizontal bed surface provided by accumulator support mechanism 36.

Immediately after all the beams in the first layer have been moved onto the accumulator bed and out of contact with microswitches 158 and 160, the elevator bed then moves automatically up to the next mortising position after which a layer of beams are pushed over the mortising blades by the next set of drag tabs 103 on transfer chains 80. This sequence of automatically raising the bed stepwise, mortising a single layer of beams, and accumulating the mortised beams continues until all mortised beams have accumulated on accumulator bed 25. Thereafter bed lift motor 104 automatically stops to allow the mortised beams to be removed from the accumulator bed.

After the mortised beams are removed, the operator then pushes a reversing switch 163 to energize a reversing latching relay 164 of latching relay 156 to supply power to the reversing side of latching relay 156, which reverses the rotation of the bed lift motor 104 and returns the elevator bed and accumulator bed to their initial positions. As the elevator bed reaches its initial position, it engages a normally open micro-switch 166 located below it to energize a forward coil 168 of latching relay 156, which in turn reverses the bed lift motor to its forward drive position and opens a normally closed contact 170 to stop the downward movement of the elevator at a position ready to receive the next load of uncut beams.

The electrical system for controlling movement of the elevator and accumulator beds includes a completely manually operative system in which normally closed switches 172, 174, and 176 may be opened during operation of the machine to respectively stop mortise blade drive motor 68, chain drive motor 82, and bed lift motor 104 for emergency purposes or the like. The electrical system also includes a normally open switch 178 which may be closed at any time during reverse movement of the bed-lift motor to stop the motor and change it to its forward drive position. The electrical system also includes a normally open switch 180 which is closed to permit the bed-lift motor to run automatically in its step-wise movement. Switch 180 is connected in series with switch 166 and a second limit switch 182 below accumulator bed 36. Switches 166 and 182 are in the circuit to limit downward travel of the elevator bed and accumulator beds, respectively.

The use of the mortised beams produced by mortising machine 10 is best understood by referring to FIGS. 7 and 8. FIG. 7 shows a typical framed wall structure 184 mounted on a foundation 186. The wall frame includes a pre-mortised lower plate 188 and a pre-mortised upper plate 190. Vertically extending and horizontally spaced apart studs 192 are fitted into opposing pairs of notches mortised in the bottom and upper plates. Each stud 192 is held rigidly in place in its respective notches by nails shown schematically at 194. The nails are driven longitudinally through each plate and into the ends of the studs. Cripples 196 above and below a window frame 198 also are fitted into the pre-mortised lower and upper plates.

Wall frame 184 also includes a pre-mortised top plate 200 secured above plate 190 such that the notches cut in the top plate open upwardly to receive longitudinally spaced apart ceiling joists 202.

Further use of the pre-mortised beams is illustrated in FIG. 8 which shows a pre-mortised mud-sill 204 secured to the top of a foundation slab 206 by foundation bolts 208. The upwardly opening notches in mud-sill 204 receives laterally spaced apart floor joists 210 which support a sub-floor 212 on which wall frame 184 is mounted.

Thus, the pre-mortised beams provide substantial savings of time and money in conventional housing construction. The amount of toe-nailing required to secure studs, cripples, ceiling joists, and floor joists to plates and mud sills is substantially reduced by the pre-mortised beams. More importantly, however, the time consuming conventional procedure of measuring to determine the proper positions for studs, cripples, and joists is eliminated. The notches in all premortised beams are accurately aligned so that the workman does not have to take the time to measure to determine the accurate position and alignement of studs, cripples and joists. Moreover, the mortising machine disclosed requires merely seven minutes to mortise one loading (28 2 × 4 inch beams) or 540 lineal feet of beams by a single workman when bed lift motor 104 is driven at 3 r.p.m.

I claim:

1. A machine for mortising a load of beams in a continuous operation to form premortised plate material in preparation for the subsequent construction of the framing of a building from the mortised plate material, the machine comprising a work support bed lying in a substantially horizontal plane, a set of spaced apart and substantially vertically disposed rotary driven mortising blades in the plane of the bed, means for continuously feeding several side-by-side stacks of beams adapted to serve as plate material to a predetermined position adjacent to the work support bed, the feeding means including a vertically movable elevator bed adjacent the work support bed for supporting the several stacks of beams, and power operated lifting means disposed below the elevator bed for exerting an upward force on the bottom of the bed to lift a row of side-by-side beams to the plane of the work support bed, and stack transfer means movable in a horizontal plane and spaced above the elevator bed and the work support bed for both (a) applying a horizontal pushing force to an uppermost row of beams to move the beams from the support of the elevator bed into the work support bed and (b) moving the beams into contact with the mortising blades, the lifting means and the stack transfer means being sequentially operative in timed relation to each other to alternately feed an uppermost row of beams to the plane of the work support bed and push the beams onto the work support bed, the mortising blades extending vertically upwardly from the plane of the work support bed to provide working edges spaced sufficiently above the plane of the work support bed that they form longitudinally spaced apart notches in the bottoms of the beams extending across the width of each beam.

2. Apparatus according to claim 1 including an accumulator bed positioned adjacent to the work support bed and operative in timed relation to movement of the stack transfer means to move mortised beams away from the work support bed.

3. Apparatus according to claim 2 in which the accumulator bed is operatively coupled with the lifting means so as to lower a row of side-by-side beams in timed relation with the lifting of the beams by the elevator bed.

4. Apparatus according to claim 3 including means for reversing movement of the elevator bed and the accumulator bed so as to lower and lift them, respectively, to an initial position in readiness for receiving a new supply of beams.

5. Apparatus according to claim 1 in which the lifting means includes a rigid guide system below the elevator bed for maintaining the bed in a fixed attitude during its vertical movement.

6. Apparatus according to claim 5 in which the guide system includes fixed vertical guide means below the elevator bed, a pair of longitudinally spaced apart rigid lifting bars attached to the underside of the elevator bed and movable in the guide means, and drive means disposed below the work support bed and engaged with the lifting bars to raise and lower the lifting bars to provide guided vertical movement of the elevator bed.

7. Apparatus according to claim 5 including an accumulator bed positioned adjacent the work support bed and operative in timed relation to movement of the stack transfer means to move mortised beams away from the work support bed, and including a rigid guide system below the accumulator bed for maintaining the bed in a fixed attitude during its vertical movement.

8. Apparatus according to claim 1 in which the stack transfer means comprises a pair of longitudinally spaced apart endless transfer chains each spaced above the plane of the work support bed by a distance substantially equal to the thickness of a row of beams, and a seaprate stack transfer member carried on each transfer chain for engaging the row of beams to push them from the elevator bed onto the work support bed.

9. Apparatus according to claim 6 in which the stack transfer means comprises a pair of longitudinally spaced apart endless transfer chains each spaced above the plane of the work support bed by a distance substantially equal to the thickness of a row of beams, and a separate stack transfer member carried on each transfer chain for engaging the row of beams to push them from the elevator bed onto the work support bed.

10. Apparatus according to claim 1 in which the mortising beams are substantially equidistantly spaced apart.

11. A method of mortising a load of beams in a continuous operation to form premortised plate material in preparation for the subsequent construction of the framing of a building from the mortised plate material, the method comrising rotating a series of substantially vertically disposed mortising blades adjacent a work support bed lying in a substantially horizontal plane, supporting several side-by-side stacks of beams adapted to serve as plate material on an elevator bed adjacent the work support bed, lifting the elevator bed to position a row of side-by-side beams in the same plane as the work support bed, and moving a stack transfer member along a path in a horizontal plane spaced above the elevator bed and the work support bed to both (a) apply a horizontal pushing force to the uppermost row of beams to move them from the support of the elevator bed onto the work support bed and (b) move the beams into contact with the mortising blades, the lifting means and the stack transfer member being sequentially operative in timed relation to each other to alternately feed an uppermost row of beams to the plane of the work support bed and push the beams onto the work support bed, the mortising blades being in the plane of the work support bed and extending vertically upwardly from the work support bed to provide working edges spaced sufficiently above the plane of the work support bed that they form longitudinally spaced apart notches in the bottoms of the beams extending across the width of each beam.

12. The method according to claim 11 including exerting an upward force on the bottom of the elevator bed to lift the beams to the plane of the work support bed.

13. The method according to claim 11 including providing a rigid guide system below the elevator bed for maintaining the bed in a fixed attitude during its vertical movement.

14. The method according to claim 11 including moving an accumulator bed positioned adjacent the work support bed in timed relation to movement of the stack transfer member to move mortised beams away from the work support bed.

15. The method according to claim 14 including providing rigid guide systems below the elevator bed and accumulator bed to maintain both beds in a fixed attitude during their vertical movement.

* * * * *